No. 795,049. PATENTED JULY 18, 1905.
F. MAIER.
TOY.
APPLICATION FILED DEC. 29, 1904.
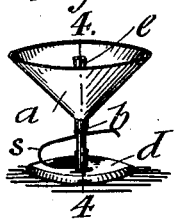
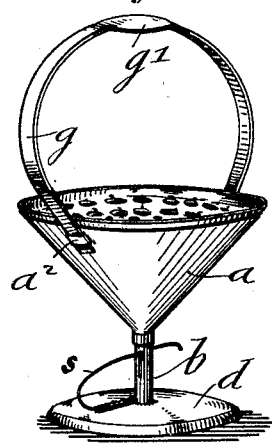
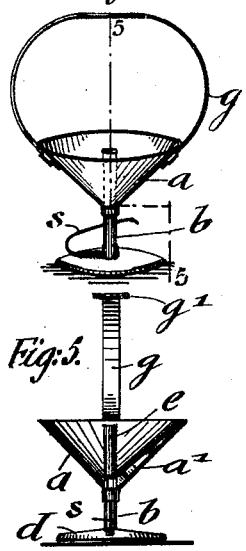
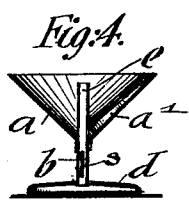
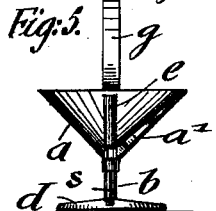
Witnesses
Inventor
Friedrich Maier
By his Attorneys No. 795,049.                                    Patented July 18, 1905.

UNITED STATES PATENT OFFICE.

FRIEDRICH MAIER, OF ELIZABETH, NEW JERSEY.

TOY.

SPECIFICATION forming part of Letters Patent No. 795,049, dated July 18, 1905.

Application filed December 29, 1904. Serial No. 238,815.

*To all whom it may concern:*

Be it known that I, FRIEDRICH MAIER, a citizen of the United States, residing in Elizabeth, in the county of Union and State of New Jersey, have invented certain new and useful Improvements in Toys, of which the following is a specification.

This invention relates to an improved toy which forms an entertaining toy for throwing up small leather or other balls, it being possible to change the toy into a game in which several children can play by the addition of a perforated receiving-disk for the balls; and for this purpose the invention consists of a toy which comprises a funnel-shaped body supported by a tubular neck on a disk-shaped base, said body being provided with a central tube having an opening at its connection with the base of the funnel and a raised shoulder in the funnel extending toward the opening in the tube for returning the ball, and a spring attached to the base of the toy and passing with its free end through the center tube of the funnel.

The invention consists, further, in the combination with the funnel-shaped portion of the toy, of an arched guard-piece inserted into keepers of the funnel-shaped body and extended diametrically over the same, said guard-piece being provided with a disk-shaped enlargement vertically above the center tube of the funnel-shaped body; and the invention consists lastly, in combination with the funnel-shaped body and the ball-ejecting tube, of a flanged disk provided with a central perforation and a number of openings in the same into which the ball is to be played, as will be fully described hereinafter and finally pointed out in the claims.

In the accompanying drawings, illustrative of one embodiment of the invention, Figure 1 is a perspective view of my improved toy, showing it in its simplest form. Fig. 2 is a perspective view of the toy with the guard attachment. Fig. 3 is a like perspective showing the toy with the guard attachment and perforated receiving-disk. Figs. 4 and 5 are respectively vertical central sections on line 4 4, Fig. 1, and line 5 5, Fig. 2. Fig. 6 is a vertical central section of the device shown in Fig. 3. Fig. 7 is a plan view of the funnel-shaped body, and Fig. 8 is a plan view of the perforated disk or covering for said body.

Similar letters of reference indicate corresponding parts.

Referring to the drawings, $a$ denotes a funnel-shaped body, $b$ the tubular neck or shank of the same, and $d$ the base-disk on which the funnel-shaped body is supported. The funnel-shaped body, tubular neck, and base-disk are preferably made of suitable sheet metal in any suitable size, according to the use for which the toy is designed. In the funnel-shaped body $a$ is arranged a central tube $e$, which forms an extension of the tubular neck and which is provided at the lower portion or base of the funnel with an opening $o$. Alongside of the opening $o$ is arranged in the funnel a radial shoulder $a'$. The tubular neck $b$ is provided with horizontally-alined diametrical slots $b'$, through which passes the free end of a wire spring $s$, the lower end of which is soldered or otherwise attached to the base-disk $d$. The free end of the spring is bent or rounded off, so as to permit the actuating of the spring for ejecting a ball, such as a lead shot or small marble, which is placed in the center tube through the diametrical slots at some distance above the same, said ball being thrown into the funnel-shaped body and returned along the radial shoulder and opening $o$ at the lower part of the center tube $e$ into position on the free end of the spring, so as to be ejected again by the next actuation of the spring, and so on. The play of the ball by its successive ejections through the center tube by the spring provides the amusement for the child working the same.

For the purpose of preventing the loss of the ball by ejecting it outside of the funnel-shaped body an arched guard-piece $g$ is arranged above the funnel-shaped body, the ends of said guard-piece being inserted into keepers $a^2$ at diametrically opposite points of the body $a$, said guard-piece being likewise made from sheet metal and provided at its highest part with a disk-shaped enlargement $g'$, against which the balls are thrown when ejected from the center tube by the spring and returned by the same back into the body *a* with less liability of being dropped outside of the body and lost.

The toy with its guard-piece as so far described can only be used by one child by throwing the ball successively as described.

When it is desired to make a game of the toy in which several children can play with the same toy, a perforated disk *f*, which is provided with a circumferential flange *f'* and with a short center tube *f²*, is used in connection with the funnel-shaped body by slipping the slit center tube *f²* over the tube *e* of the body *a*. The disk is preferably made concave and arranged with a number of holes around the slitted center tube, the holes being preferably numbered and given different values, so that when the ball is dropped into one of the holes closer or farther away from the center tube the different values can be put down and finally added. One child can then play one or more balls and get credit for the different positions of the same on the perforated receiving-disk *f*. In this manner an additional interest is imparted to the throwing of the balls. The receiving-disk is likewise made of sheet metal which may be made either of tin or suitably colored or plated metal when an ornamental character is desired to be imparted to the toy.

The toy can be made cheaply by means of dies from tin or other suitable sheet metal and readily put together by soldering or riveting. It can be conveniently packed for shipping by removing the guard device from its keepers and placing it in position below the funnel-shaped body, or a number of said toys can be nested and put together for sale in toy stores, as desired. My improved toy forms a comparatively cheap and entertaining device for indoor use and is a source of entertainment to young and old when used in connection with the perforated ball-receiving disk in the manner described.

Having thus described my invention, I claim as new and desire to secure by Letters Patent—

1. A toy, comprising a funnel-shaped body, a slitted neck-tube, a base-disk, a spring attached to the base-disk and passed with its free end through the slitted neck-tube, and a center tube in said funnel-shaped body, said center tube being a continuation of the neck-tube and provided with a side opening for receiving a ball or similar projectile.

2. A toy, comprising a funnel-shaped body provided with a radial shoulder, a slitted neck-tube, a base-disk, a spring attached to the base-disk and passed with its free end through the slitted neck-tube, and a center tube in said funnel-shaped body, said center tube being a continuation of the neck-tube and provided with an opening at its lower part near the base of said funnel-shaped body.

3. A toy, comprising a funnel-shaped body, a slitted neck-tube, a base-disk, a spring attached to the base-disk and passed with its free end through the slitted neck-tube, a center tube in said funnel-shaped body, said center tube being a continuation of the neck-tube and provided with an opening for receiving the ball at its lower part near the base of the funnel-shaped body, and an arched guard-piece provided with a disk-shaped enlargement alined with said center tube.

4. In a toy, the combination, with a funnel-shaped body, a neck-tube, a spring operating in said neck-tube, a center tube in said funnel-shaped body, said center tube being provided with an opening for receiving the ball at its lower part near the base of the funnel-shaped body, of a perforated disk supported on said funnel-shaped body and having an opening registering with said center tube.

5. A toy, comprising a funnel-shaped body provided with an inner radial shoulder, a neck-tube, a base-disk, a spring operating in said neck-tube, a center tube in said funnel-shaped body, said center-tube being a continuation of the neck-tube and provided with an opening at its lower part near the base of the funnel-shaped body for receiving a ball or the like, an arched guard-piece having a central disk-shaped enlargement, and a perforated ball-receiving disk provided with a center tube extending over the center tube of said body.

In testimony that I claim the foregoing as my invention I have signed my name in presence of two subscribing witnesses.

FRIEDRICH MAIER.

Witnesses:
PAUL GOEPEL,
HENRY J. SUHRBIER.